United States Patent [19]
Stewart

[11] Patent Number: 5,408,899
[45] Date of Patent: Apr. 25, 1995

[54] FOOT PEDAL DEVICES FOR CONTROLLING ENGINES

[75] Inventor: Joseph L. Stewart, Dearborn Heights, Mich.

[73] Assignee: Brecom Subsidiary Corporation No. 1, Warren, Mich.

[21] Appl. No.: 75,885

[22] Filed: Jun. 14, 1993

[51] Int. Cl.6 ........................ F02D 11/10; G05G 1/14
[52] U.S. Cl. ........................................ 74/513; 74/514; 74/560; 123/399
[58] Field of Search .................... 74/513, 514, 560; 123/361, 399; 180/335

[56] References Cited

U.S. PATENT DOCUMENTS

| Re. 34,302 | 7/1993 | Imoehl | 123/399 |
|---|---|---|---|
| Re. 34,574 | 4/1994 | Imoehl | 123/399 |
| 4,582,653 | 4/1986 | Blanchard et al. | |
| 4,869,220 | 9/1989 | Imoehl | |
| 4,915,075 | 4/1990 | Brown | |
| 4,944,269 | 7/1990 | Imoehl | |
| 4,958,607 | 9/1990 | Lundberg | |
| 5,233,882 | 8/1993 | Byram et al. | 74/514 |

FOREIGN PATENT DOCUMENTS 4-128519  4/1992  Japan ................................... 74/513

*Primary Examiner*—Richard M. Lorence
*Attorney, Agent, or Firm*—Krass & Young

[57] ABSTRACT

An accelerator pedal for electronic, "by wire" control which provides the customary feel of mechanical control systems heretofore predominantly in use including a hysteresis effect. Readily available simple mechanical components coupled to a sensing and transmitting device are employed.

14 Claims, 4 Drawing Sheets

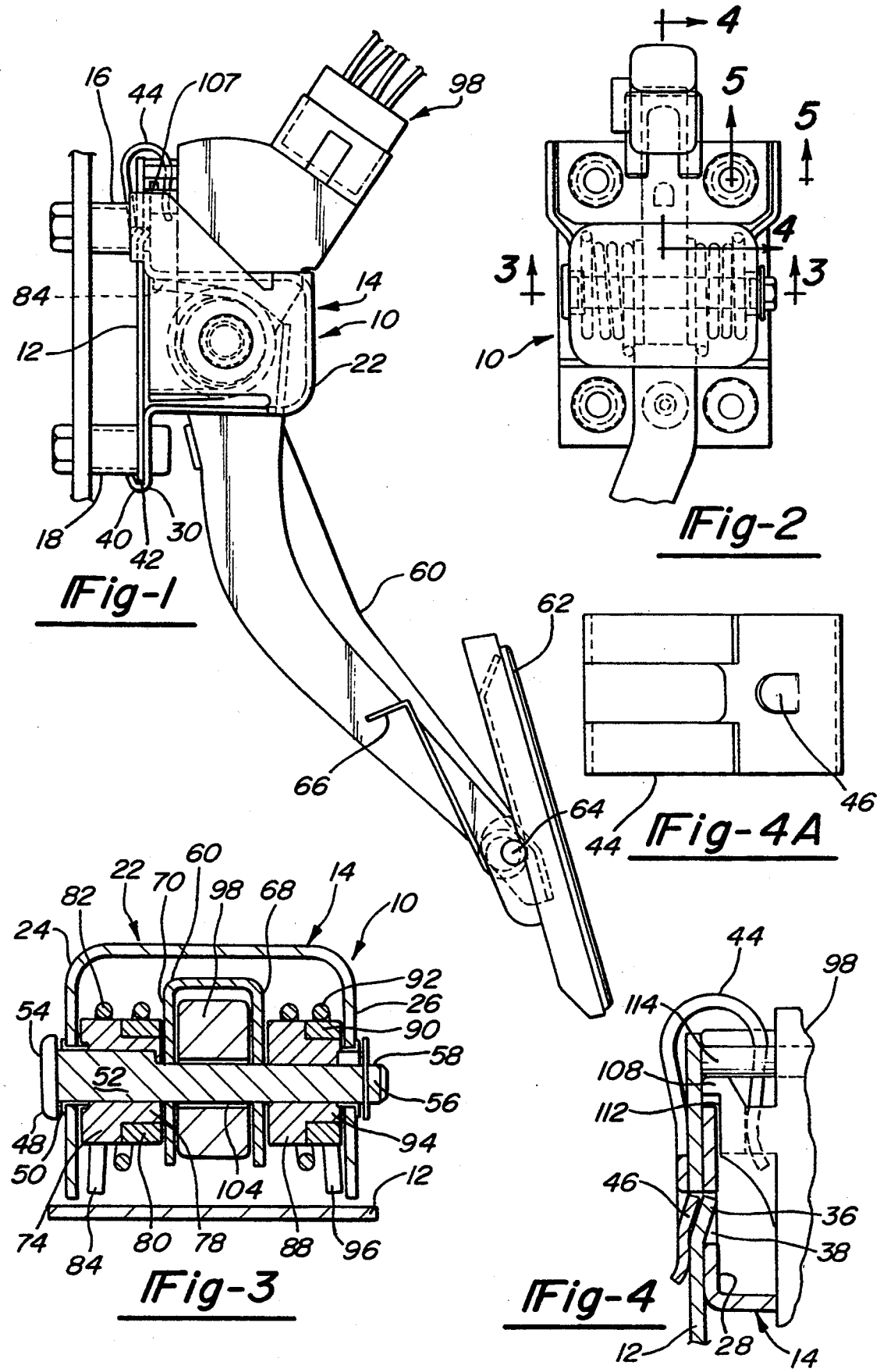

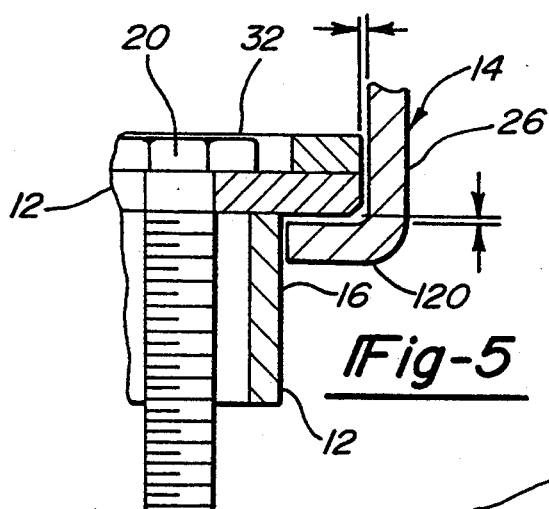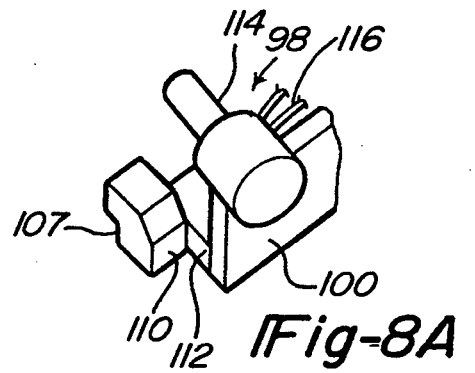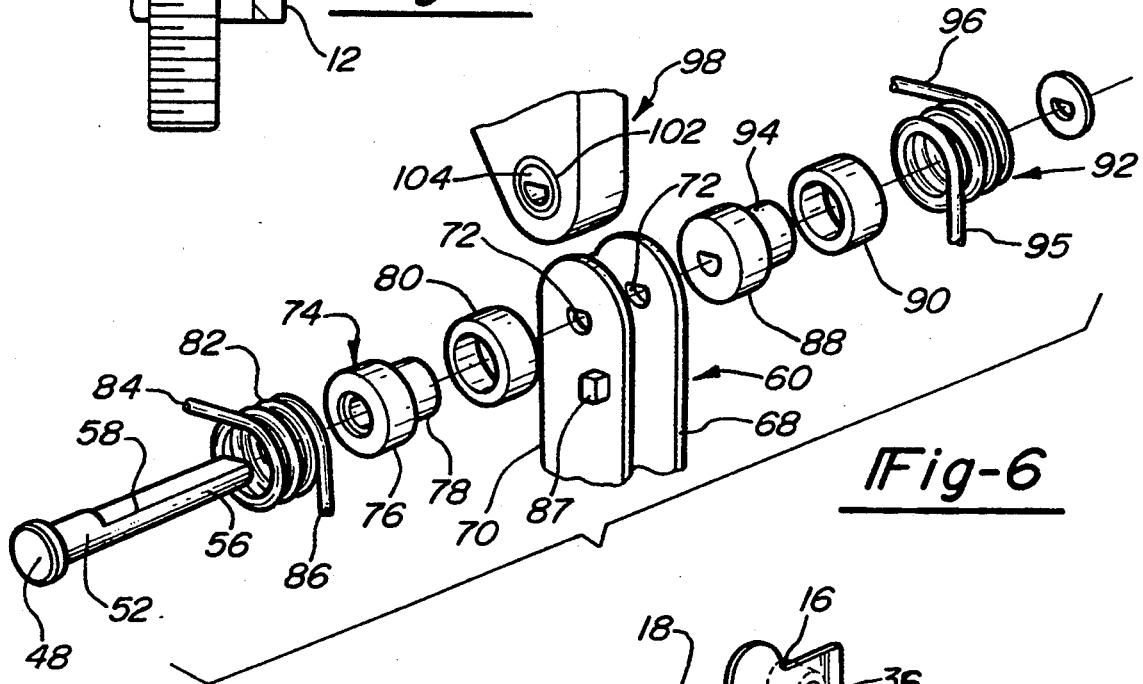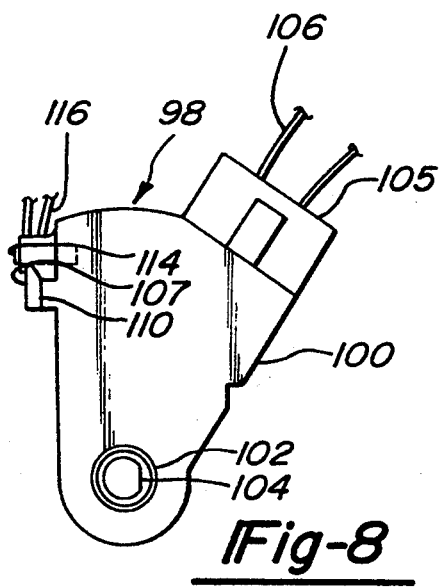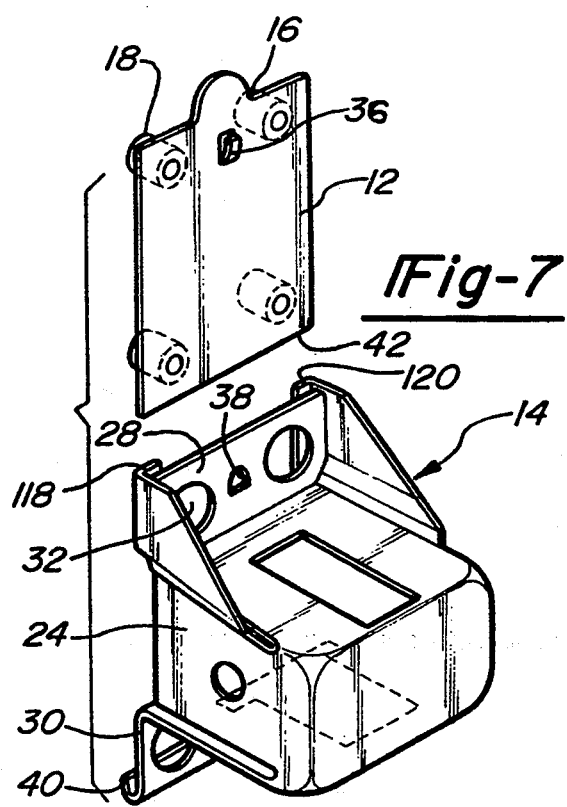

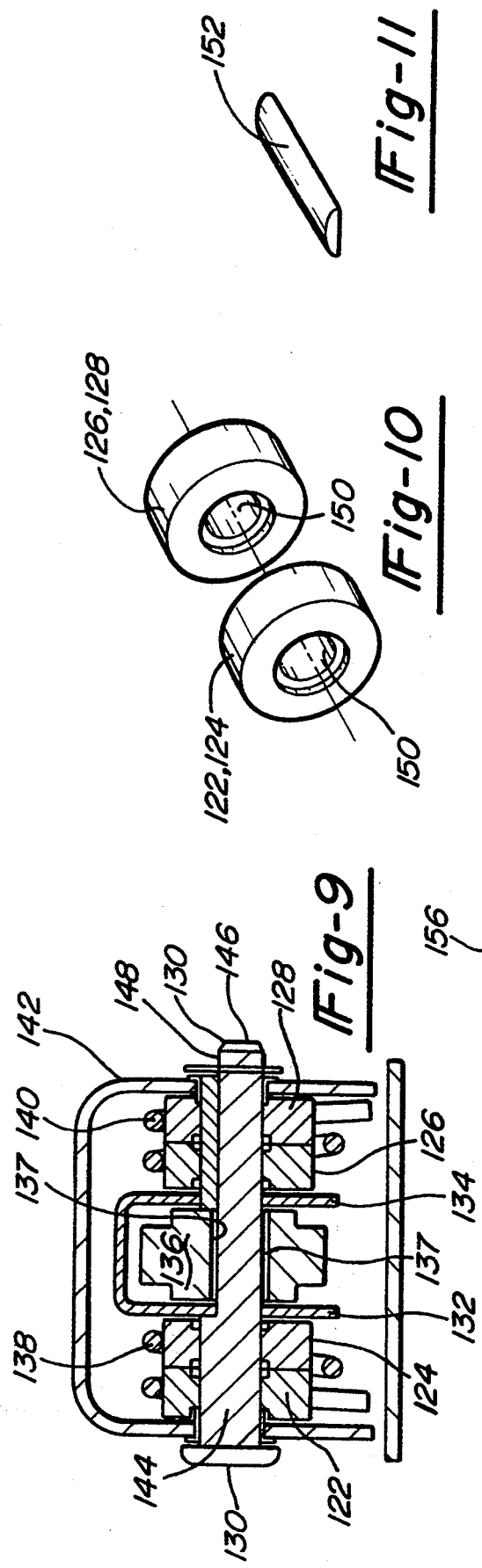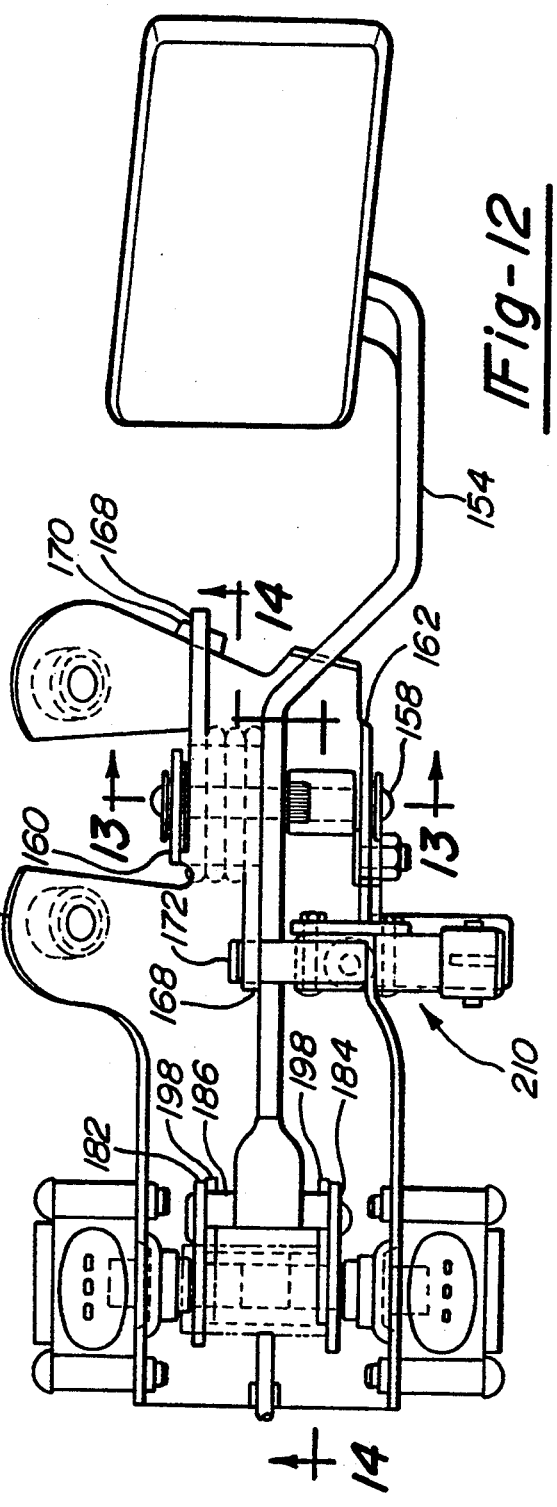

FOOT PEDAL DEVICES FOR CONTROLLING ENGINES

BACKGROUND OF THE INVENTION

1. Field Of The Invention

This invention relates to foot pedal devices for controlling engines such an internal combustion engines, and more particularly, to means for providing control without the need for direct mechanical connection between the pedals and the engines. The invention is particularly directed to providing means and methods for control by wire, i.e., by electrical or electronic means rather than by mechanical links. In the automotive art, accelerator type foot pedals are employed for controlling the flow of fluids to the engines. These usually include a pedal mounting affixed to the vehicle body and a series of links and levers, or bowden wires, connecting the pedal to the carburetor, fuel injector, controller or the like. These link connections usually must be designed to withstand and accommodate engine movements relative to the vehicle frame, as well as to provide accurate control despite such movements. In addition, space must be provided for the linkages to function properly. The choices for routing of the mechanical control rods or wires are limited by their nature. With electrical sensing means directly associated with the pedal, the connection to a carburetor or the like can be accomplished with electrical wiring which relatively speaking, can free the connection problems from the special physical relationships of the older mechanical systems.

Wire type throttle control for motor vehicle engines has been known heretofore. Some construction vehicles, buses and large trucks have used some form or the other for some time. In these instances, however, pedal or other lever control means can be designed without regard to some of the restraints that apply to automobile use. Pedals can be more rugged, higher pedal pressure can be tolerated and less responsive action can be overlooked. Generally, the requirements reflect the usage of the vehicle. For example, the requirement of a system for a rough off-road vehicle would likely reflect its prospective usage. With passenger cars pedal pressures and reaction times are more critical. The pedal system must be one that provides a customary feel and performance for the "typical" driver. Safety of operation with rapid yet controlled return from a high load position to a lower idle position are important considerations, as is the amount of force needed to maintain a desired speed setting. The pedals must function responsively and quickly to the operator's commands and also provide an acceptable non-fatiguing resistance. Drivers are accustomed to applying and releasing pressure on a pedal-like arrangement and become accustomed to the resistance to application of force to the pedal as well as to the rate of withdrawal as the applied pressure is relaxed. With the instant invention, the customary feel during the application of force to increase speed and while maintaining speed, as well as the familiar deceleration movement of the pedal can be duplicated in a wire type control.

With the typical auto, the pedal pressure required when advancing the accelerator pedal is greater than that required to maintain a fixed position. This difference is often referred to as due to the hysteresis effect. This "effect" is important in maintaining the accelerator pedal in position while driving at a relatively constant speed, and it must also be considered in achieving a desired deceleration time. The pressure which must be applied in accelerating is easily borne but if the back pressure of an accelerator spring produced the same effect during the time it was required to retain or maintain speed it would soon become uncomfortable for the operator to maintain a relatively constant speed. The hysteresis effect provides relief. It lessens the load required to maintain a setting of the accelerator yet there is still force to cause reverse pedal action when the foot applied pressure is removed. This invention provides means for insuring a hysteresis effect which will give the desired reduction in pressure while maintaining speed, as contrasted to the resistance experienced in accelerating, and yet with which there will be insured an appropriate force to return the system to idle.

FEATURES OF THE INVENTION

According to the invention in a preferred form the accelerator pedal is supported by a shaft mounted in a bracket which can be easily placed in the desired position on the vehicle for comfortable use by an operator. An electronic sensing device also preferably mounted in the bracket is mechanically associated with the pedal or its supporting shaft so as to sense the movement of the pedal. The sensed movement is transmitted electrically to an engine controller. A torsion spring is used to exert force between the bracket and the pedal constantly urging the pedal toward idle position. The spring must be supported along its length. Thus the spring coils are supported by an arrangement mounted on the shaft in the form of at least a pair of spacers. The spring closely fits the spacers and contacts the spacers. The spring coils bear directly against the spacers and the spacers are rotatably mounted on the shaft which supports the pedal thus the spring is also supported by the shaft. Further the torsion spring is locked at each end with one end being fixed relative to the bracket and the other to the pedal. The spring ends bear heavily against the spacers in their locked positions and this in turn causes frictional contact between the spacers and their support on the shaft. As the spring is twisted when the pedal rotates the coils offer resistance to the movement of the lever. Furthermore the interaction between the coil spring and the spacers and the spacers and the shaft produces a frictional resistance to movement which adds to the natural resistance of the spring coil itself during movement of the pedal in an accelerating effort. This frictional resistance encountered during acceleration also plays a part if the coils start to unwind or if the decision of the driver is to maintain a constant speed. It is this frictional resistance in the coil-spacer-shaft association that provides the hysteresis effect. This effect and the resistance to the initial downward movement of the pedal can be controlled by selection of components and their physical relationships.

With the use of at least a pair of spacers the desired friction resistance can be obtained, the coil properly supported and yet the life expectancy of the system greatly improved. The use of at least two spacers, as will be explained hereinafter, reduces the amount of wear caused by rubbing of the spring upon its supports and of its supporting elements such as spacers with respect to a shaft, as contrasted to the wear that would occur if a single unitary support for the spring along its whole length was used.

Reliability over long periods of time with little or no maintenance is also critical with passenger car equipment. Often virtual neglect of maintenance is the choice of many owners. Unlike commercially well maintained vehicles ordinary passenger cars must go for extended period without service or even an inspection for preventive maintenance. Travel of the spring coil upon the surface of a pair of spacers rotatably supported upon a shaft will be less then upon a single spacer or a shaft itself. With use of at least a pair of spacers the desired frictional and supportive relationship of the spring to the lever can be obtained, the hysteresis effect can be more readily adjusted and life expectancy can be greatly improved.

A further feature of the invention is that commonly available components can be used in incorporating its concepts.

A further requirement for an engine controller is insurance of a return to neutral or idle position whenever the pedal is released. According to the instant invention the very nature of a unique pedal mounting can be utilized to ensure a return to idle even should there be a failure elsewhere. According to the invention a normally functioning pedal control as well as an override idle control are contained in one single readily attachable unit having a mounting bracket. A single mounting bracket can thus be employed yet maximum reliability achieved. Both the normal pedal actuated return to idle and the idle override function upon the release of the pedal. Yet the override function is independent of and operates regardless of any slow moving sequence which might occur via the pedal to controller channel or in the event of a complete failure of the controller system. According to the invention the bracket can be formed of two relatively movable elements with one element fixed and the other movable upon application of pedal pressure, coupled with an idle override means which senses their relative positions. This is in addition to the sensing means associated with the pedal which normally signals for an idle position whenever the pedal is released. Upon actuation of the pedal to increase speed one of the bracket parts will move relative the other deactivating the override feature. However, upon release of the pedal the bracket parts return to their idle position relationship causing the idle override to reinitiate the idle override signal. Even if the pedal to control System should cease functioning and or stick in a higher than idle position the relaxation of pressure on the pedal also relieves pressure on the bracket and the idle override will become effective.

These and other advantages and objects will become apparent from the following description and the accompanying drawings wherein:

BRIEF DESCRIPTION OF THE DRAWINGS

FIG. 1 is a side elevation of an accelerator pedal including a supporting bracket;

FIG. 2 is a front elevation of an accelerator pedal;

FIG. 3 is a fragmentary section taken along line 3—3 of FIG. 2;

FIG. 4 is fragmentary section taken along line 4—4 of FIG. 2;

FIG. 4a is a plan view of a spring;

FIG. 5 is a fragmentary section taken along line 5—5 of FIG. 2;

FIG. 6 is a fragmentary perspective view showing pairs of spacers and torsion springs in association with a pedal and a sensing device;

FIG. 7 is a fragmentary perspective view of a bracket;

FIG. 8 is a side elevation of a sensor;

FIG. 8a is a fragmentary perspective view of the sensor;

FIG. 9 is a fragmentary section view similar to FIG. 3 but showing a second form of spacer-pedal-bracket-spring arrangement;

FIG. 10 is a perspective view showing a pair of spacers;

FIG. 11 is a perspective view showing a shaft insert;

FIG. 12 is a top plan view of another form in which the invention is embodied;

DESCRIPTION OF A PREFERRED EMBODIMENT

Figure 13:
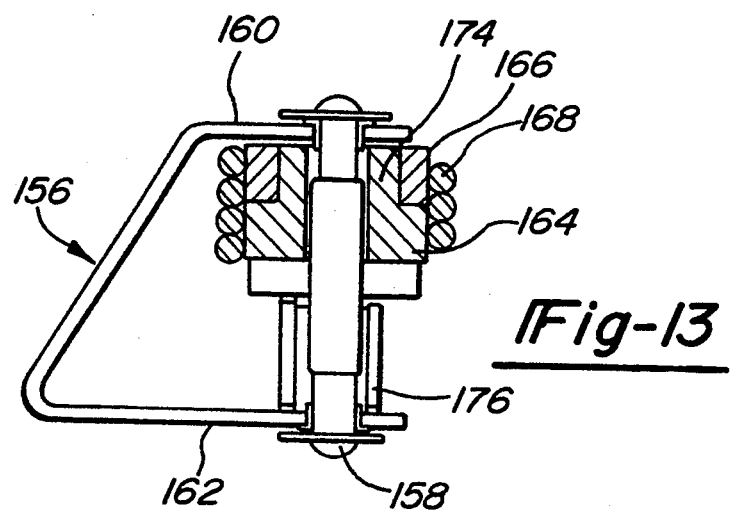
FIG. 13 is a section taken along line 13—13 of FIG. 12.

Referring now in particular to FIGS. 1–7 of the drawings, a preferred form of the invention comprises a pedal support bracket 10 formed of two relatively movable members, plate 12 and pedal support member 14. Plate 12 is in the form of a rectangular plate. The plate has sleeves 16 and 18 adapted to bear against a vehicle structure and through which fastening means such bolts 20, FIG. 5, can be inserted to fasten plate 12 and thus the bracket to a vehicle. Pedal support member 14 comprises a housing 22 formed of a U-shaped plate having side panels 24 and 26, and upwardly extending flange 28, and a downwardly extending flange 30. Flanges 28 and 30 face and are adapted to bear against plate 12.

Flanges 28 and 30 are held against plate 12 when the pedal is in idle position as hereinafter described. Openings 32 in flanges 28 and 30 provide clearances for heads of bolts such as 20, FIG. 5.

Plate 12 has a section pressed out therefrom to form a ledge 36, see FIGS. 4 and 7. This is received in mating opening 38 formed in flange 28 and serves as a vertical support and guide for pedal support member 14 when plate 12 is supported vertically as indicated in FIG. 1 on a vehicle member. Flange 30 of bracket member 14 has a lower lip 40 which receives and engages lower edge 42 of plate 12, see FIGS. 1 and 7. The connection is such that bracket member 14 can rotate relative plate 12 about their juncture. The edge 42 of plate 12 forms a fulcrum for rotation of bracket member 14.

A bifurcated retainer spring 44 urges the bracket members into contact along their vertical facing surfaces. Retainer spring 44, see FIGS. 4 and 4a, has a projecting locking member 46 formed in it which fits into the opening resulting from the formation of ledge 36 in plate 2 and, as will be explained hereinafter, helps maintain the members in position.

Side panels 24 and 26 rotatably support pivot shaft 48 and suitable bushings 50, FIG. 3. Shaft 48 has a cylindrical section which is adjacent its headed end 54, and a cylindrical section 56, together with a flat surface 58 formed thereon extending to the other end of the shaft. Accelerator pedal lever 60 supports a foot pad 62 through a suitably connected pivot 64, and a spring 66 which in conjunction with a stop functions to position the foot pad in appropriate position.

The pedal has a pair of upper arms 68 and 70 provided with D-shaped openings 72, FIG. 6, which fixedly position the pedal on the shaft 48.

On the cylindrical side 52 of the shaft there is rotatably supported a first spacer 74, see FIGS. 3, 4 and 6. Spacer 74 has a cylindrical outer section 76 and a rightwardly extending, as viewed in FIGS. 3 and 6, stub shaft cylindrical section 78. Upon stub shaft 78 there is rotatably mounted a second spacer or ring 80. Upon the two spacers 74 and 80 there is supported a helical torsion spring 82. The ends 84 and 86 of spring 82 are locked respectively to bracket member 14 and the pedal 60. Spring end 86 bears against stop 87 on lever 60, FIG. 6, and end 84 bears against the upper inner surface of the pedal support member 14, FIG. 1. The spring is held under torsional load tending to urge the pedal and shaft 48 to the idle position, as shown in FIG. 1. The two spacers support the spring and the opposite spring ends because of the locked relationship they bear with the lever and the lever support, respectively bear firmly against the two spacers. Spacer 80 is thus forced firmly against the stub shaft 78 of spacer 74 and spacer 74 is urged against the shaft 52 by the force of the spring.

The components are designed so that the pressure of spring end 84 prevents rotation of spacer 74 and shaft 48 rotates within spacer 74. At the same time, the force of spring end 86 on spacer 80 forces the later to rotate with pedal 60 and shaft 48 and upon sub shaft 78. The force of the spring ends is such, by design, as to result in frictional resistance between the two spacers and between spacer 74 and shaft 52. By selecting proper fits and the general design of the components the amount of the resistant achieved can be controlled.

The spacers thus provide support for the torsionally loaded spring, maintaining it circumferentially around shaft 48, and at the same time they provide a selected resistance to motion which provides the hysteresis effect desired during pedal operation. The frictional resistance created by the spacers adds to the resistance offered by the coil spring in advancing the pedal toward a higher output level. However this frictional resistance provided by the spacers will oppose the torsional load of the spring as foot pressure is relaxed. This gives relief from the resistance felt during advancing of the pedal which is desirable when operating at a steady speed condition or in reducing the speed level. Adequate pressure to return to idle upon complete release of the pedal however is retained through proper design of the components. The pair of spacers provide yet another advantage, namely ease of assembly. The spacers make it easy to mount the spring upon the shaft and particularly when they are designed as shown in the instant form with one spacer mounted on the other. The spacers can be readily inserted into the spring and placed upon the shaft. Further the spacers lessen the wear by spreading it over a broader surface. If the shaft was not provided with a pair of spacers one on the spring ends would wear a groove in the shaft as one end of the spring rotated relative to the other. With the instant invention the likelihood of wear at any one point due to friction is at least cut in half by virtue of the shaft rotating within one spacer end or one of the spacers rotating on the other.

To improve action, equalize the load on both arms of the lever, increase safety and lessen the possibility for complete failure, a second set of spacers 88 and 90 is mounted on the right semi-cylindrical end of the shaft as viewed in FIGS. 3 and 6 and coupled with a second torsion spring 92. The spacer 88 in this instance has a stub shaft 94 which is rotatably received in the spacer 90. Spacer 88 has a central D shaped opening which mates with the fiat section 58 on shaft 48, and the semi-cylindrical surface of shaft 48. Thus spacer 88 is locked by one end of spring 92 to the pedal arm 68 by a stop on arm 68 of the same shape and size as stop 87. Pedal arm 68 is also locked to shaft 48, and spacer 88 is also locked directly to shaft 48 by the flat surface 58 on the shaft 48 and the D shaped configurations in pedal 68 and spacer 88. The other end 96 of spring 92 locks spacer 90 to bracket member 14. As a result when pedal 60 rotates shaft 48 spacer 88 rotates within spacer 90. Friction between the spacers 88 and 90 contributes to the hysteresis effect which counters the force of the coil spring urging the pedal to return, but which adds to the force of the spring in resisting pedal movement to increase speed.

A position sensor and transmitter 98 is also mounted on shaft 48 between the pedal arms 68 and 70, FIGS. 3, 4, 6, 8 and 8a. The sensor has a housing 100 having bearing 102 in which there is rotatably supported a sleeve 104. Sleeve 104 has a D shaped interior mating with the flat semi-circular section of shaft 48. Within housing 100 there is motor driven by sleeve 104 and other components that sense the position of shaft 48. Electrical coupler 105 serves to connect these components via leads 106 to the electrical source and to transmit the sensed information. The sensor-transmitter is available commercially from the Robertshaw Company, and CTS Corporation and the nature of its internal sensing components plays no part in the present invention except to function as a sensor transmitter. The housing and bearing has however been particularly designed to mate with the components of the instant invention. Further there is, as hereinafter described, an idle switch feature which is unique to the instant invention.

In the latter regard the housing 100 comprises a pair of arms 107, 108, FIGS. 1, 4, 8 and 8a. As shown, the sensor 98 is positioned with its two arms facing the plate 12. The arms project outwardly from the side of the housing 100 and present rearwardly facing, as compared to the surface of plate 12, vertical surfaces 110 on which the legs of spring 44 bear, FIGS. 4 and 4a. Spring 44 thus urges sensor 100 against plate 14. The outwardly extending arms form part of a projection 112 from housing 100.

The idle switch feature includes a second sensing means comprising plunger 114 which is connected to an on/off switch, of known design, and which is mounted within housing 100. Plunger 114 is normally urged by an internal spring within the sensing means to open the on-off switch. The arrangement is such that plunger 114 is forced into housing 100 by plate 12 when support member 14 is in idle position under the influence of the retainer spring 44 the internal switch operated by the plunger 114 will close signaling that the engine should be brought to idle condition. The switch will send a signal to the controller via leads such as 116. This will be an addition to the signal sent by rotation of sleeve 104 in the sensing device when it returns to the idle position illustrated in FIG. 1. The idle signal given by the idle override switch through actuation by plunger 114 will override any signal that may be still given by the sensing device 58. In the event that for some reason the pedal-coil spring-spacer-sensor system 98 has failed the override signal will come into effect and cause return of the engine to the desired idle condition. Bracket pedal support member 14 has affixed to flange 28 a pair of limit arms 118 and 120, FIGS. 5 and 7, which limit the pivotal movement of member 14 relative plate member 12 about ledge 42 of plate 12. Spring 44 maintains both sensor 98 and bracket pedal support member 14 in the idle position shown in FIGS. 1, 2, 3, 4 and 5.

The operation of the electronic pedal assembly when the pedal is moved away from idle condition is as follows: when the pedal 60 is pressed downward the pedal support member 14 initially moves away from plate 12 under the urging of the increased pressure from the torsion spring ends engagement with member 14. The pressure on the pedal overcomes the spring retainer 44. The contact between the pedal support member 14 and projection 112 on the sensor forces the sensor 98 to move with the pedal support member 14. After a move of about 0.5 mm, away from plate 12 the arms 118 and 120 on support 114 prevent further movement of pedal support member 14 and sensor 98 away from plate 12. The shaft 48 however can continue to rotate driving the sensing unit within the Sensor 98. This initial movement also is sufficient to disable the plunger actuated idle override switch since the plunger is free to move to open the switch when member 14 moves away from plate 12. The torsion spring-spacers-lever support members now function as described above.

When pressure is released from the pedal sufficiently to permit lowering to the idle condition again the torsion spring will return the elements in the pedal support member 14 to neutral condition, and at the same the spring 44 will bring sensor 98 and plunger 114 and the pedal support member to the neutral position of FIGS. 1 and 4 in which the idle override signal will be effective. If the pedal-torsion spring connections or the controller itself should fail retainer spring 44 will nonetheless bring the two bracket member together and the idle override switch will still function to bring the engine to idle condition. Engine controllers suitable for use with pedal devices embodying the instant invention are well known in the art.

Referring now to FIGS. 9, 10 and 11 wherein a second form of spacers and spring arrangement according to the invention is shown: spacers 122, 124, 126 and 128 are provided in conjunction with the shaft 130 to which is attached the pedal arms 132 and 134 and the sleeve 137 of sensor 136, which sleeve is similar to the sleeve 102 of FIGS. 3 and 8. Torsion springs 138 and 140 are supported by the spacers, and, as in the form shown in FIG. 3, the opposite ends of the springs 138 and 140 are locked to the pedal support 142 and the pedal arms 132 and 134. Shaft 130 is constructed with a complete cylindrical section 144 to the left and a right section 146 having a flat 148. Spacers 122 and 124 have cylindrical centers 150 which mate with the cylindrical end of the shaft. Spacers 126 and 128 also have cylindrical central sleeves which mate with the shaft 130 and a semi-cylindrical key 152 which fills the flattened portion of cylinder 130 between the spacers 126 and 128. In the same manner as those shown in FIGS. 1–8, spacers 124 and 126 rotate with the lever while spacers 122 and 128 move with bracket member 142.

FIGS. 12–15 show yet another embodiment of the invention including yet another embodiment of spacer-torsion spring-pedal arrangement. Referring thereto: pedal 154 is rotatably supported in bracket 156 on a shaft 158, FIGS. 12 and 14. The opposite ends of the spring 168 are, respectively, locked to the bracket 156 at stop 170, and lever stop 172, FIGS. 12 and 14. The arrangement is such that the spring ends bear against the spacers with the force against the spacer 164 locking spacer 164 to the lever, and the force of the spring end on spacer 166 locking the latter spacer 166 to the bracket 156.

As shown in FIG. 13 spacer 164 has a stub shaft 174 on which spacer 166 is rotatably mounted, as in the form shown in FIG. 6. As a result spacer 164 rotates with the lever 154, with the stub shaft rotating within but frictionally bearing against spacer 166. Lever 154 is locked to shaft 158 upon knulled sections of shafts 158. Only one set of torsion springs and spacers are mounted on shaft 158 on one side of the lever. On the other side a simple spacer 176 is freely rotatably mounted to assist in maintaining the horizontal position of lever 154 on shaft 158.

Figure 14:
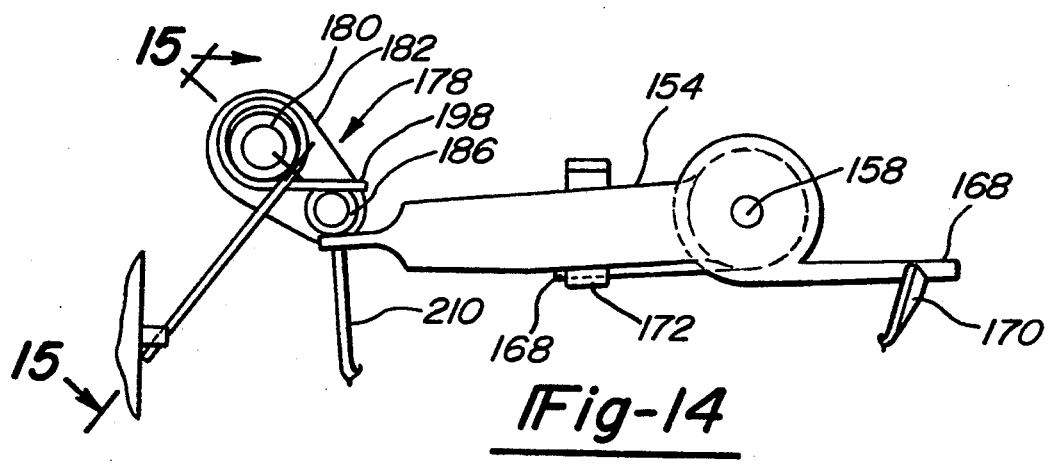
FIG. 14 is a section taken along line 14—14 of FIG. 12.
Figure 15:
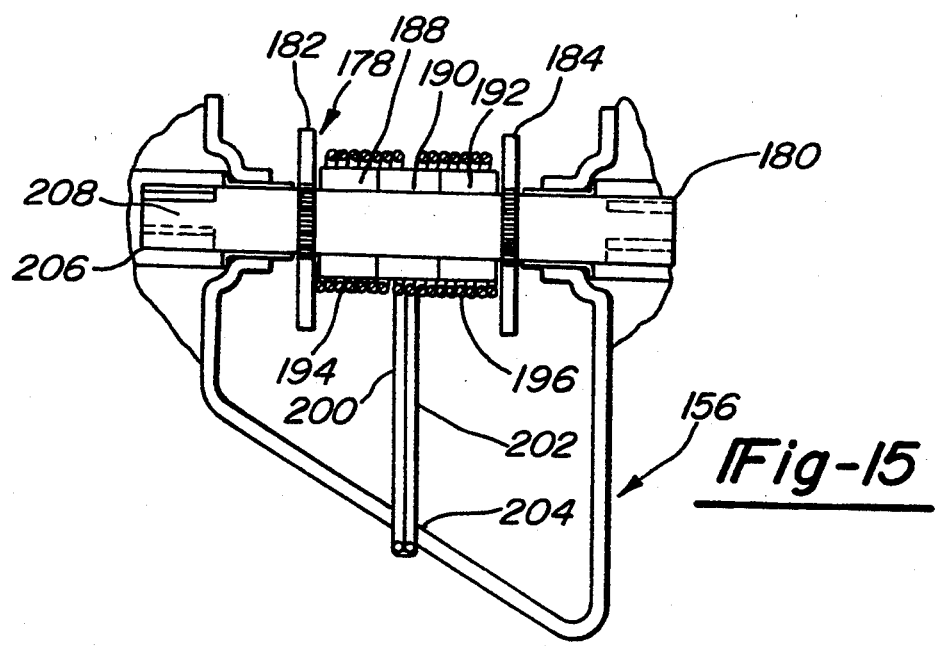
FIG. 15 is a section taken along line 15—15 of FIG. 14.

Lever 154 is actually part of a bell crank control system including a bell crank 178, FIGS. 14 and 15 comprising a pair of links 182 and 184 affixed to shaft 180 which is rotatably supported in bracket 156. The cranks may be affixed to the shaft through the use of knulled sections and force fits. The bell crank includes a sleeve 186 affixed to and fixedly spacing the links.

Three spacers 188, 190 and 192 having cylindrical bores are rotatably supported on the shaft 158 between the links and adjacent to each other and the links respectively. A pair of coiled torsion springs 196 are supported by the spacers and each spring has an outer end 198 bearing against cylindrical sleeve 186 and an inner end 200 and 202 respectively as seen in FIGS. 14 and 15, bearing against a stop 204 on the bracket 156. The stop is formed in this instance by an opening in bracket 156 into which the spring ends are inserted. The arrangement is such that the spring ends 198 adjacent to the links 182 and 184 are locked to the sleeve 186, and the pressure against the sleeve 186 lock spacers 188 and 192 to the bell crank 178. The force of the spring ends 200 and 202 effectively lock the spacer 190 to the bracket 156. As a result although shaft 180 rotates within spacer 190, there is frictional resistance to such movement producing a hysteresis effect as discussed above. The frictional resistance occurs because the spring ends 200 and 202 force the spacer 190 into contact with the shaft 180 to such a extent as to create the frictional resistance.

Electrical sensing devices of a known kind 206 are affixed to the shaft end 208 and motion of the pedal is transmitted by wire to the engine control as described heretofore. The lever 154 bears against sleeve 186 and transmits motion to the bell crank member through the sleeve. A stop 210 limits the movement of the lever at the idle condition. Further an idle override is mounted in bracket 156. When the pedal pressure is relieved to return to neutral this override switch will function to return the engine to idle level regardless of the position of the spring-spacer system.

Having described my invention, many modifications thereto will become apparent to those skilled in the art to which it pertains without deviation from the spirit of the invention as defined by the scope of the appended claims.

What is claimed is:

1. An accelerator pedal assembly for an electronic throttle control comprising
a shaft, a pedal supported on said shaft, a bracket supporting said shaft for pivotal movement of said pedal, said pedal having an idle engine throttle position and being movable therefrom to power increasing throttle positions;

a coiled torsion spring having one section thereof affixed to said bracket and one section affixed to said pedal and continuously urging said pedal to idle throttle position, means supporting said spring and maintaining its relationship to said pedal comprising a pair of longitudinally aligned spacers positioned within and supporting said spring, said spacers being supported by said shaft and each spacer being engaged with one of the portions of said main spring affixed to said bracket and to said pedal respectively, with one of said spacers being held in fixed relationship to said bracket by said spring, the other of said spacers being held in fixed relationship to said pedal and being pivotal therewith, with said one of said spacers being rotatably mounted with respect to said shaft and to said other of said spacers by means providing frictional resistance to relative rotation of said other of said spacers with respect to each other and of said other of said spacers with respect to said shaft, whereby one of said spacers pivots with said pedal and the section of said spring supported by the latter one of said spacers upon rotation of said pedal while the other of said spacers remains substantially fixed with respect to said bracket and the section of said spring supported by the latter other of said spacers, and the latter other of said spacers offers frictional resistance to movement of said pedal which frictional resistance adds to the resistance of said spring to movement of said pedal from idle throttle position toward power increasing throttle positions, but opposes the force of said spring urging said pedal to return to idle position.

2. The accelerator pedal assembly of claim 1 wherein said one of said spacers is rotatably mounted on the other of said spacers.

3. The accelerator pedal assembly of claim 1 wherein said one of said spacers is rotatably mounted on said shaft.

4. The accelerator pedal assembly of claim 3 wherein said other of said spacers is rotatably mounted on said shaft.

5. The accelerator pedal assembly of claim 1 including a second set of spacers and a second torsion spring with said second set of spacers supporting said second torsion spring, said second set of spacers being supported by said shaft, with one of said second set of spacers being rotatably supported with respect to said shaft and to said other of said second set of spacers, with said second set of spacers being affixed, respectively, one to said lever and the other to said bracket by respective sections of said second spring, and with one of said second set of spacers being rotatably supported by means providing frictional resistance to rotation relative said shaft which will augment the resistance to rotational movement of the first mentioned other of said spacers imposed by the association between the latter spacer and its support.

6. The accelerator assembly of claim 1 including means for sensing the rotational position of said pedal with respect to said bracket and transmitting the information sensed to a receiving means.

7. The accelerator assembly of claim 1 wherein said bracket is formed of two members one of which serves as a mounting plate for said pedal assembly and the other of which bracket members rotatably supports said shaft and said lever, means supporting said other of said bracket members on said one of said bracket members for rotation with respect to said one of said bracket members about an axis extending parallel to but spaced transversely of the axis of pivotal movement for said pedal, said means supporting said other of said bracket members comprising means forming a pivotal connection between said members, and means for maintaining said pivotal connection including means resiliently urging said members into a first position corresponding to an idle engine throttle position of said pedal and resiliently resisting movement of said other of said members relative said one of said members from said idle engine throttle position.

8. The accelerator assembly of claim 7 including means for sensing the relative rotational position between said bracket members and including means for transmitting sensed information to a receiving means.

9. An accelerator pedal comprising a supporting bracket an acceleration pedal rotatably supported in said bracket for movement from an idle fuel position to a maximum fuel input position means for sensing the rotational position of said pedal relative said bracket and means for transmitting such sensed information to an engine control element means for resisting movement of said pedal from the idle fuel position toward the maximum fuel input position and operative upon movement of said pedal from idle fuel position to return said pedal to the idle fuel position upon release of pressure on said pedal comprising;

a helically coiled spring having a first end member engaging said bracket and a second end member engaging said lever in a relationship to each other which places said spring under torsional load along its length when said pedal is in idle position and such as to increase said torsional load on said spring and said pedal as said pedal moves from idle toward maximum fuel position, said spring constantly urging said lever to said idle position, means maintaining said spring in relatively fixed position relative the axis of rotation of said pedal and for creating a hysteresis effect on the torsional load of said spring whereby the force resisting movement of said pedal from idle position toward maximum fuel position will be greater than the force urging said pedal to idle position upon relaxation of force upon the pedal urging the pedal toward maximum fuel position, comprising a pair of axially aligned cylindrical spacers positioned within and supporting said spring, one of said spacers being in frictional engagement with the one of said spring ends bearing against said bracket, the other of said spacers being in frictional engagement with the other of said spring ends engaging and bearing against said lever, means supporting said other of said spacers for relative rotation with respect to said one of said spacers about a common axis, the latter means being in frictional contact with said other of said spacers whereby, when said spring is torqued under influence of movement of said pedal the said other of said spacers will be forced to rotate upon its support despite the frictional resistance to such movement provided by engagement with said means supporting said other of said spacers, and whereby when pressure on said pedal urging said pedal toward a maximum fuel input position is relaxed the frictional engagement of the latter spacer with its supporting means will resist the torsional force of said spring urging said pedal to return to idle fuel position.

10. A pedal assembly for an electronic throttle control comprising a pedal, a bracket for mounting said pedal, means supporting said pedal on said bracket for movement from an idle position to a maximum power position and return, helical spring means for resisting movement of said pedal toward a maximum power position and returning said pedal to said idle position said helical spring means including spring sections respectively reacting against said bracket and said pedal so as to maintain a torsional load on said spring and constantly urge said pedal toward said idle position, second means for resisting movement of said pedal from said idle fuel position toward said maximum power position and resisting return movement of said pedal to said idle position comprising a pair of cylindrical spacers positioned within and supporting said helical spring one of said spacers frictionally engaging a spring section reacting against said bracket and supporting the latter spring section and a portion of the helical coils of said spring in position with respect to said bracket, the other of said spacers frictionally engaging a second spring section reacting against said lever and supporting the latter spring section and a second portion of the helical coils of said spring and maintaining the latter spring section in position with respect to said lever, whereby said spring exerts a torsional force against said pedal and is supported in a substantially fixed helically coiled condition, means supporting said spacers so as to maintain a frictional contact between said spacers and their respectively engaged sections of said spring resisting rotational movement of said spacers relative their respectively engaged said sections, said means supporting said spacers rotatably supporting said one of said spacers, with the contact between said one of said spacers and its support means providing frictional resistance to said rotation of said one of said spacers relative to its support means, the latter frictional resistance being less then the frictional resistance to movement provided by engagement between the end of said spring reacting against said bracket and said one of said spacers, whereby upon movement of said pedal said other of said spacers will move with said pedal while said means supporting the latter said one of said spacers will rotate within said one of said spacers, and the frictional resistance to rotation of said the latter spacer with respect to said means supporting the latter spacer will add to the torsional force of said spring resisting movement of said lever toward a maximum power position, but will act against the force of said spring tending to return said pedal to idle fuel position upon relaxation of force exerted upon said pedal urging said pedal to a maximum power position.

11. The pedal assembly of claim 10 wherein said spacers are supported on a common shaft.

12. The pedal assembly of claim 10 wherein said shaft rotatably supports said pedal in said bracket.

13. The pedal assembly of claim 10 wherein said spacers are both supported directly upon said shaft.

14. The pedal assembly of claim 10 wherein one of said spacers is rotatably supported upon the other of said spacers.

* * * * *